US005533274A

United States Patent [19]

Westling

[11] Patent Number: 5,533,274

[45] Date of Patent: Jul. 9, 1996

[54] GAUGE TO MEASURE PROPER POSITIONING OF STARTER MOTORS ON ENGINES

[76] Inventor: John Westling, 705 Highway 18, Princeton, Minn. 55371

[21] Appl. No.: 439,292

[22] Filed: May 11, 1995

[51] Int. Cl.$^6$ .................................................... G01D 21/00

[52] U.S. Cl. ................................................ 33/600; 33/655

[58] Field of Search ............................. 33/600, 501, 613, 33/655

[56] References Cited

U.S. PATENT DOCUMENTS

| | | | |
|---|---|---|---|
| 1,281,628 | 10/1918 | Mix . | |
| 2,162,338 | 6/1939 | Larsen | 33/600 |
| 2,316,188 | 4/1943 | Rose | 33/600 |
| 2,367,004 | 1/1945 | Chitwood . | |
| 2,688,193 | 9/1954 | Holton . | |
| 2,780,872 | 2/1957 | Mills, Sr. . | |
| 2,821,788 | 2/1958 | Wendt | 33/600 |
| 3,409,989 | 11/1968 | Herbert et al. | 33/600 |
| 3,640,128 | 2/1972 | Cunning et al. | 33/600 |
| 3,691,641 | 9/1972 | Bell et al. | 33/600 |
| 3,845,566 | 11/1974 | Rameson . | |
| 4,212,111 | 7/1980 | Saari | 33/655 |
| 4,422,242 | 12/1983 | Stocker | 33/600 |
| 4,455,865 | 6/1984 | Davenport et al. | 33/600 |
| 4,506,447 | 5/1985 | Lob | 33/655 |
| 4,580,446 | 4/1986 | Ansteth | 33/600 |
| 4,625,416 | 12/1986 | Ohtaki et al. | 33/600 |
| 4,642,900 | 2/1987 | Provost et al. . | |
| 4,790,074 | 12/1988 | Warr et al. . | |
| 4,993,165 | 2/1991 | French et al. . | |
| 5,133,134 | 7/1992 | Ambrose . | |

*Primary Examiner*—Thomas B. Will
*Attorney, Agent, or Firm*—Haugen and Nikolai

[57] ABSTRACT

A gauge for releasable attachment to internal combustion engines at the starter motor mounting point for determining proper positioning and selection of starter motor housings for the individual engine. The gauge includes a housing with a base surface portion having a configuration defining a gauge mounting pad, along with bores to receive bolts for attachment of the housing to the engine block. A pivot pin mounts an elongated lever within the housing for pivotal rotation about the pin, and a reference scale is attached to the housing so that the position of the lever arm within the housing is ascertainable by the scale. A pinion mounting yoke is mounted on the opposed end of the lever and is arranged to appropriately position the pinion in proper and standard engagement with the teeth of the ring gear on the engine flywheel.

4 Claims, 3 Drawing Sheets

GAUGE TO MEASURE PROPER POSITIONING OF STARTER MOTORS ON ENGINES

BACKGROUND OF THE INVENTION

The present invention relates generally to an improved gauge means for determining the dimensional suitability of certain starter motor housings for mounting upon specific individual internal combustion engines. The gauge means of the present invention is designed to determine the distance between the surface of a known plane such as the plane of the starter motor receiving pad on an engine block and a location on the teeth of the ring gear surrounding the engine flywheel, with the "location" being, for example, the working depth of a remote gear such as the engine's ring gear. This ring gear typically has a working relationship with the starter motor mounting pad, since the plane of the mounting pad determines the depth or extent of engagement of the teeth of the pinion gear with the mating teeth of the ring gear. While having application for all engines, including newly-manufactured engines, the gauge means of the present invention has particular application for use in connection with reconditioned and/or rebuilt starter motor housings, and is utilized to determine the suitability of certain reconditioned starter motor housings for use and application on individual internal combustion engines. Because this measuring operation involves a blind determination of meshed gear positions, it has been a persistently difficult task, particularly with fully assembled vehicles.

Starter motors are machines and/or mechanisms for rotating engine components, typically the crankshaft, from dwell to a speed at which the engine will start. Starters for internal combustion engines are typically powered by the storage battery, and may range in power from a few horsepower up to at least about 15 horsepower for large diesel engines. Starter motors are designed to produce high power output for short time intervals without generating substantial quantities of heat. This is accomplished by accelerating the engine components to a start-up speed in a relatively short time interval.

The starter motor typically engages the engine components through its pinion gear, with the pinion being positioned on the starter motor shaft. The engine ring gear is normally engaged by the starter pinion, with the ring gear typically being located on the outer circumference of the flywheel.

Pre-engaged starters are now almost exclusively utilized in the automotive field. These starters utilize a solenoid which drives the pinion into mesh with the ring gear prior to delivery of power or current to the starter motor. In addition to driving the pinion, the solenoid typically closes a pair of contacts, the closure of which commences delivery of current to the starter motor. Appropriately indexed pinion gears are utilized to assure alignment between the teeth of the pinion and the teeth of the ring gear. Overriding and/or unidirectional clutches are typically employed to avoid starter motor problems whenever the pinion remains in mesh after the engine is started. While short intervals of post-mesh engagement are common, long or extended periods of post-engagement mesh can cause substantial damage to an ordinary starter motor.

In the manufacture of engine blocks for internal combustion engines, the primary base reference or datum point is the location of the main bearings. On automotive engines in particular, electric starter motors are almost universally utilized for engine-starting purposes. The mounting point for starter motors is typically a pad milled directly on the engine block along or adjacent the oil pan rail. The precise location of the pad including the location of its plane is determined with reference to the main bearings. Manufacturing techniques are such that differences frequently occur in the reference height between the starter motor mounting pad and the main bearings. Because of the anomalies and imperfections which occasionally occur in the production of engine block castings, the precise location and plane of the starter motor mounting pad may vary from engine-to-engine, while at the same time remaining within certain acceptable manufacturing tolerances. For example, it is common to have a variance in the location of the axis of the crankshaft relative to the oil pan rail starter mount. One of the early operations on an engine block is the boring of the crankshaft centerline along with the boring of the main bearings and boring for the oil pan mounting screws. The starter mount is frequently along a plane which extends parallel to the axis of the crankshaft, with the radial spacing between the plane and the crankshaft axis frequently varying from engine-to-engine.

Over the years, the main variation in engine blocks is the difference in height of the pad with reference to the axis of the crankshaft because factory operations may result in cutting of the main bearing bores deeper into the block whenever the original cut or the machining does not appropriately "clean up" the main bearing bore. This, coupled with the natural cumulative effect of tolerances in starter mounting bolt hole location presents and creates the problem solved by the gauge means of the present invention.

With ordinary wear on the engine, and with the usage that occurs over time, the starter motor mounting pad may become damaged and/or worn, and when this occurs, the mounting surface may be reconditioned and/or freshened in order to appropriately receive and securely mount the housing of a starter motor. However, most frequently, problems do arise when the components do not fall within the original manufacturing tolerances, and the engagement of the teeth of the pinion into the ring gear fails to meet the requirements for proper operation.

In the ordinary use and operation of automobiles, engine starter motors frequently wear out, become damaged, or otherwise become unworkable so that replacement is required. In order to reduce the cost and expense to the motorist, there is considerable business activity in the remanufacturing and/or reconditioning of automotive starter motors. For example, the brushes may require replacement, the armatures may require rewinding, and certain of the bearings or bushings may become worn to such an extent that replacement is required. When starter motors are reconditioned, the surface pad which mates with the engine may sometimes require reconditioning and/or freshening as well. If this operation becomes necessary, additional milling is necessary and the distance between the plane of the mounting surface relative to the axis of the pinion shaft is altered, and care must be exercised in order to assure that the proper positioning of the starter pinion with the mating flywheel ring gear is provided. Whenever the starter motor housing requires excessive machining or milling, it may become necessary to interpose shims between the mounting bases in order to provide proper meshing of the teeth of the starter motor pinion with the teeth of the ring gear.

As an added complication, in a typical automotive starting system, the components must be designed for reliable operation at widely varying temperatures. For example, engine temperatures at starting may typically vary within a range of from −40° F. to 240° F. To further aggravate the situation, on certain occasions, there may even be a mis-match in temperature between the flywheel and the starter pinion. At any rate, a persistent problem exists when close operating tolerances must be maintained for both cold and hot starts. The thermal expansion properties of the materials being utilized tend to add to the problem, thereby requiring careful control of the design and the tolerances. In a typical automotive starting system, tolerances not exceeding ±0.010 inches are routine. In presently manufactured automotive engines, the desired distance between the tip of the pinion gear and the root of the ring gear, during engagement, is 0.045 inches ±0.015 inches. Thus, this distance must be no less than 0.030 inches and not greater than 0.060 inches.

SUMMARY OF THE INVENTION

The gauge apparatus of the present invention has particular application for use in the selection of automotive starter motors for internal combustion engines where the distance between the plane of the starter motor mounting pad and the teeth of the ring gear must be determined, such as for example, when either the pad or the engine bore may have been inadvertently positoined out-of-tolerance or altered. A typical locator gauge may be employed for initially determining the distance between the axis of the pinion shaft and the plane of the mounting surface. This determination, in effect, "qualifies" the drive and housing for use. The gauge of the present invention is used for determining the spacing or distance between the meshing teeth on the ring gear and the mounting pad surface on the engine block for the starter motor. Accordingly, a proper match can always be obtained whenever a new or reconditioned starter motor is being selected for a particular engine. Because information concerning the history of the engine as well as history of the starter motor housing is generally unknown, frequent mismatches occur. Because of the essentially blind nature of the installation process, the user may not be aware of the mis-match until later when the starter motor has been installed and trouble is encountered during start-up. The starter motor pinion or the flywheel or both may be out-of-tolerance and engine and/or starter motor damage may occur during operation of the starter systems.

In order to provide appropriate lifetime to the starting system using either a new or rebuilt starter motor on a new or reconditioned engine, the gauge of the present invention facilitates checking of each starter motor housing and engine pad combination to determine suitability or proper matching. This operation cannot be done visually, since the location and/or position of the mounting pad formed on the engine relative to the main bearings cannot be readily measured with conventional instruments, the main bearings being normally inaccessible without significant disassembly and/or modification of the vehicle. For that reason, therefore, a gauge which is capable of determining the plane of the engine mounting surface relative to the flywheel pinion can provide a substantial saving in time and effort when selecting and matching a starter motor for mounting on an individual engine.

Briefly, the gauge of the present invention quickly and appropriately determines proper positioning of reconditioned starter motor housings relative to the flywheel on individual internal combustion engines. The gauge is arranged or adapted for simple and releasable attachment to the engine at the normal starter motor mounting point. The gauge includes a housing with a base surface portion having a configuration replicating a starter motor mounting pad along with means for attachment of the housing to the pad of the internal combustion engine block. A pinion lever arm is pivotally mounted within the housing upon a pin which passes through a medial point of an elongated lever arm. The pinion lever arm is designed for operative pivotal rotation about the pivot pin. The distal end of the pinion lever arm is coupled to a mounting yoke, the parallel arms of which support a shaft upon which a starter-type pinion is mounted. The position of the yoke relative to the housing is determined and/or controlled by the pinion lever arm. The proximal end of the pinion lever arm extends outwardly from the housing and a clearly visible reference scale is secured to the housing adjacent the point where the pinion lever arm passes emerges from the housing. Thus, the reference scale indicates the position of the yoke, particularly when the gauge is attached to an engine and the pinion mounted on the yoke is placed in proper driving engagement with the flywheel. The reference scale provides information with respect to the spacing which exists between the mounting pad on the engine and the working depth of the ring gear teeth. For example, if the information provided by the gauge indicates that the spacing is not within tolerance, and is indeed less than that required, it is then possible to select an appropriate starter motor which will accommodate the out-of-tolerance situation. The information provided by the gauge of the present invention will also indicate the magnitude of the out-of-tolerance reading, thereby providing a basis for proper selection of the starter motor. This information may also provide for proper shim selection if shimming would provide for a proper positioning of the pinion teeth with respect to the flywheel teeth. In order to preserve the information obtained with the gauge, means are provided for releasably holding the pinion lever at the point indicative of proper meshed engagement between the ring gear and pinion.

This operation is quick, expeditious, and reliable, and enables for a technician to appropriately select a starter motor and engine block combination which will meet the needs of the starter motor over long periods of operation under varying conditions.

Therefore, it is a primary object of the present invention to provide an improved gauge means for use in determining proper positioning and proper application of reconditioned starter motor housings for individual internal combustion engines.

It is yet a further object of the present invention to determine the suitability of reconditioned starter motor housings for normal application on individual internal combustion engines.

It is yet a further object of the present invention to determine the extent of shim placement necessary in order to properly adapt a reconditioned starter motor housing to an individual internal combustion engine.

Other and further objects of the present invention will become apparent to those skilled in the art upon a study of the following specification, appended claims, and accompanying drawings.

IN THE DRAWINGS

Figure 3:
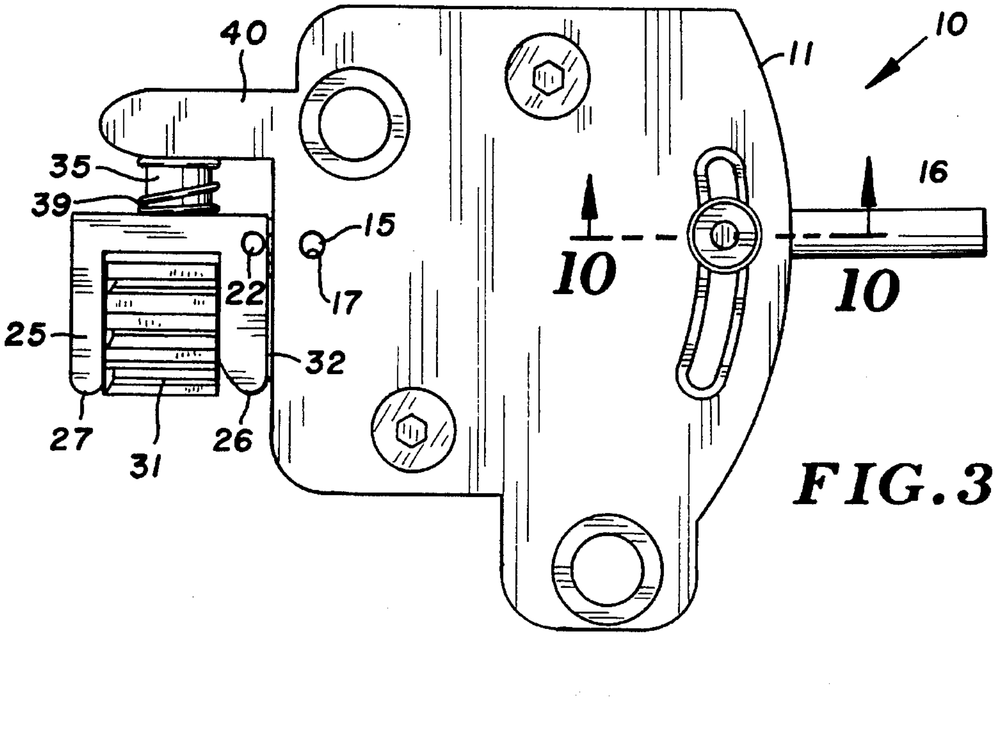
FIG. 3 is a top plan view of the gauge illustrated in FIG. 2, with FIG. 3 being shown on a slightly enlarged scale.
Figure 9:
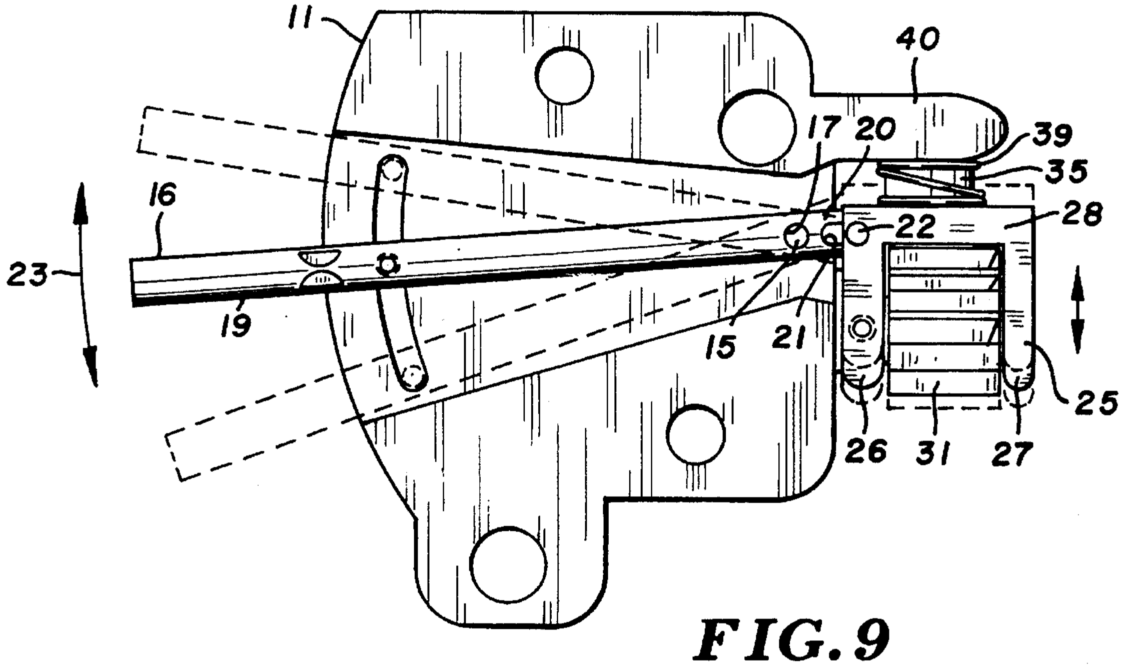
Figure 10:
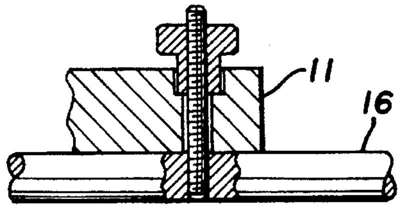

FIG. 9 is a top plan view similar to FIG. 3, with the housing top removed and illustrating, partially in phantom, the relative position of the lever and yoke in various operational dispositions; and FIG. 10 is a detail side elevational view, partially in section, and illustrating the detail of the lock nut for controlling and retaining the lever arm in position following a positional determination operation.

DESCRIPTION OF THE PREFERRED EMBODIMENT

Figure 1:
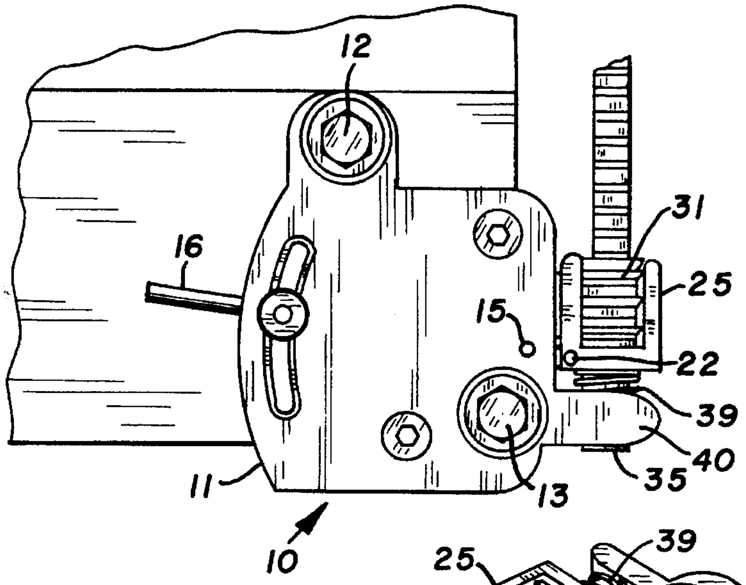
FIG. 1 is a top plan view of a gauge fabricated in accordance with the present invention, and with the gauge mounted in place on the block of an internal combustion engine, and with portions of the engine block and flywheel being cut away.
Figure 2:
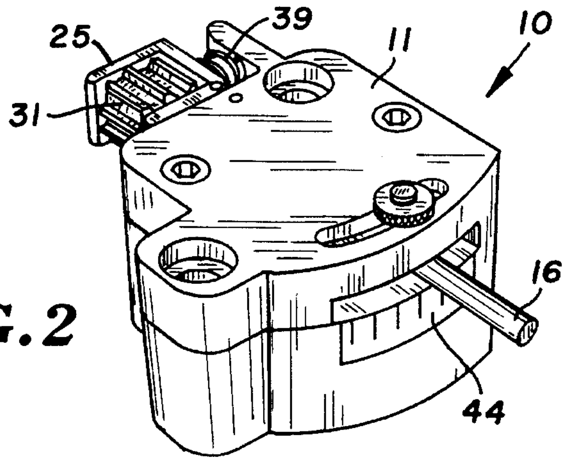
FIG. 2 is a perspective view of the front and top surfaces of the gauge means of the present invention, and illustrating the manner in which the pinion lever emerges from the housing adjacent the reference strip or scale.

With particular attention being directed to FIGS. 1 and 2 of the drawings, the gauge means generally designated 10 is designed for releasable attachment to internal combustion engines at the normal starter motor mounting point through attachment bolts, with the housing means 11 being releasably attached through attachment bolts 12 and 13. In this arrangement, particularly as illustrated in FIG. 1, the gauge means 10 is shown attached to an internal combustion engine on the normal mounting pad, normally on the oil pan rail.

The housing 11 has a base surface portion as at 14 (see FIGS. 4 and 5) with the base surface portion having a configuration defining a gauge mounting pad. The attachment bolts 12 and 13 provide a means for attachment of the housing 11 to the internal combustion engine block.

Figure 5:
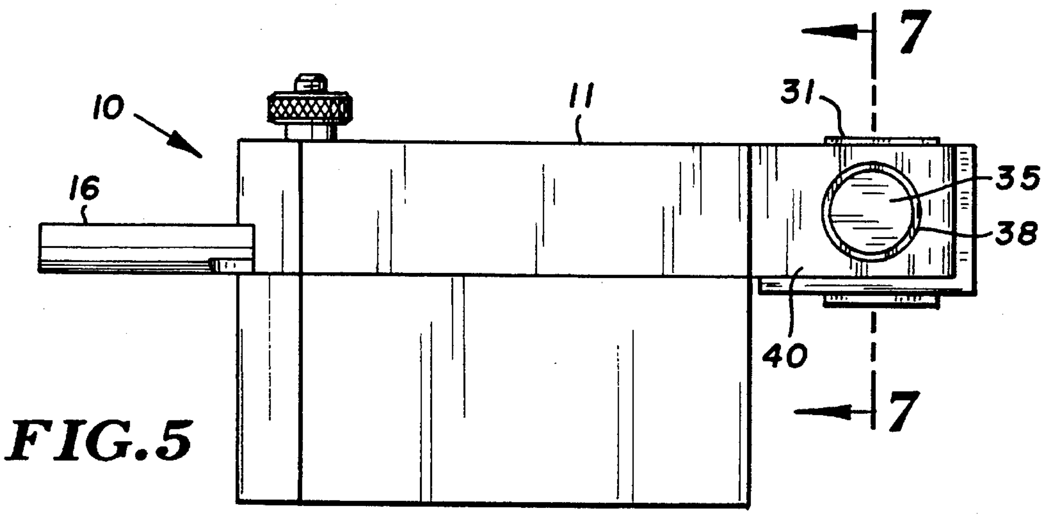
FIGS. 5 and 6 are a right side elevational view and a back elevational view respectively of the gauge.
Figure 6:
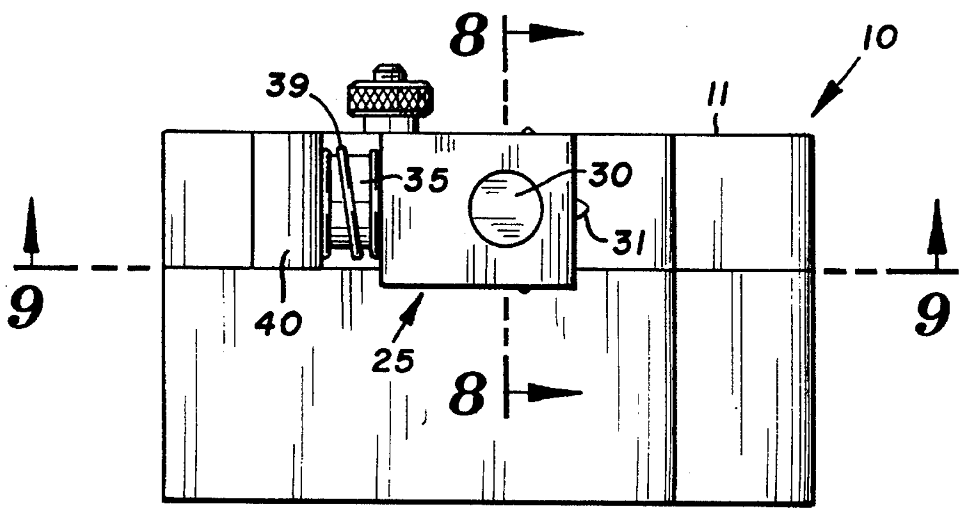

With particular attention now being directed to FIG. 5 and 9 of the drawings, pivot pin 15 is mounted within housing 11 and pinion lever 16 is provided with a bore as at 17 which receives pin 15 therewithin. Lever 16 accordingly spans pin 15 into two individual segments such as at 19 and 20. Segment 20 is forked or bifurcated as at 21 in order to capture and otherwise receive pin 22 for a purpose to be described hereinafter. In the disposition illustrated in FIG. 9, lever segment 19 forms the proximal end while lever segment 20 forms the distal end. Double-ended arrow 23 indicates the range of motion possible for lever 16.

Figure 7:
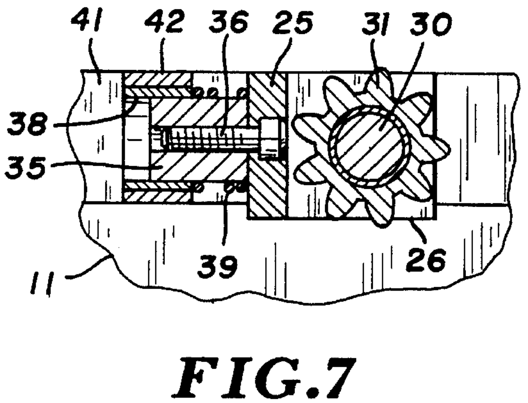
FIG. 7 is a fragmentary view, partly in section, of the pinion yoke portion and housing of the gauge.
Figure 8:
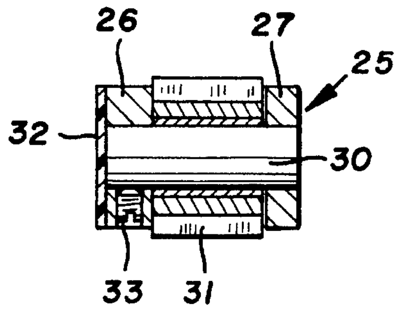
FIG. 8 is a detail view, partially in section, of the pinion yoke and pinion support shaft components.

With attention now being directed to FIGS. 7–9 inclusive, pinion receiving yoke 25 is provided which includes a body having a pair of parallelly extending arms 26 and 27 extending from base 28. Pinion support shaft 30 is held between arms 26 and 27, with support shaft 30 supporting pinion 31 thereon. Pinion 31 is a starter-type pinion, the teeth of which are utilized to engage the flywheel teeth in one operational mode. Pinion 31 is mounted on shaft 30 with its typical bronze bushing interposed therebetween, and with a nylon anti-friction pad 32 being cemented to yoke 25 for accommodating sliding movement of yoke 25 relative to housing 11. Set screw 33 is utilized to hold shaft 30 appropriately in place.

With particular attention being directed to FIG. 7, it will be observed that yoke 25 is received on yoke guide pin 35 by means of guide pin mounting screw 36. Guide pin 35 is arranged to slide within bushing 38 and is biased outwardly by spring 39. Stop member 40 is utilized for a base mount for receiving plate 41 and guides 42 hold and retain bushing 38 in place.

Figure 4:
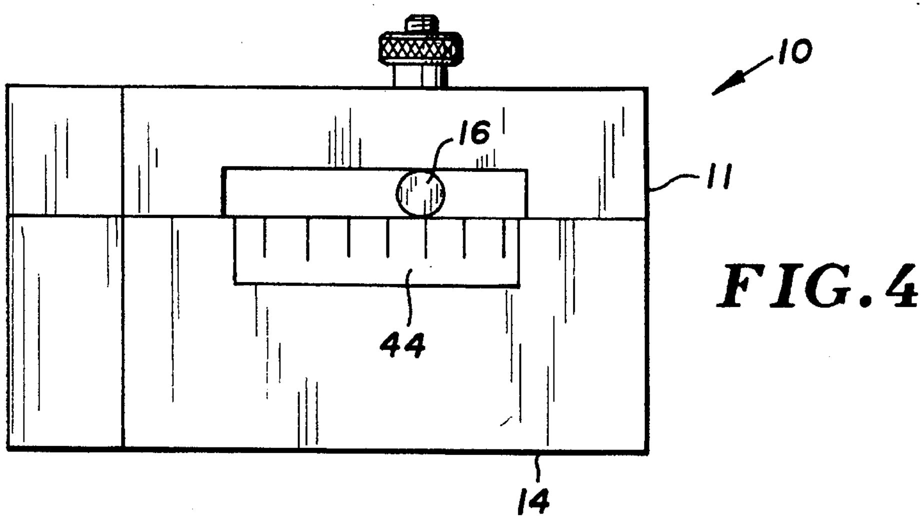
FIG. 4 is a front elevational view of the gauge.

With further reference to FIG. 2 and 4 of the drawings, it will be observed that the reference strip or scale 44 is adapted to indicate the position of the yoke 25 by virtue of the disposition of pinion lever 16. Thus, when the housing 11 is attached to an individual internal combustion engine, and when the yoke-mounted reference pinion is in proper driving engagement with the flywheel, it can be determined whether or not the engine block will receive an individual starter motor housing in proper position.

CALIBRATION OPERATION

Operation of the gauge means of the present invention starts with selection of drive and housing which are within acceptable specifications. Since the dimensional parameters of these housings are known, it is then possible to utilize the gauge means of the present invention to match these housings with individual engines. On the other hand, when it is determined that the engine components are out-of-tolerance, the corrective steps may be taken in order to achieve a proper match.

In order to calibrate the gauge means of the present invention, a relatively simple and straightforward operation may be employed. Specifically, the calibration starts with the selection of a control drive and housing unit. The control housing unit is one which is known to be within proper factory specifications. Once the control housing has been selected, the housing is positioned on locator pins with the location of the starter motor mounting base being known relative to the locator pins. The pins then engage the opposed end of the housing so as to lock the housing in the style of a die-set. The pinion shaft is then placed within the control housing in its normal operational position, and a conventional gauge head may be utilized to determine the spacing between the starter motor mounting surface and the axis of the pinion shaft. With this information known, the position of the yoke may be adjusted in order to center the pinion lever with respect to the reference strip or scale.

Thereafter, the technician may position other housings on the system, such as a remanufactured housing on the locator pins for a determination of the shaft-mounting surface spacing. It is possible, therefore, to thereafter ascertain compliance with tolerance limits for the remanufactured housings to be employed with various engine blocks and utilize the information to designate those housings with a shaft-mounting surface spacing which either exceeds or is less than the proper factory specification. If the housing is found to have an excessive spacing between the mounting surface and the pinion shaft, it may be necessary to mill away a portion of the mounting pad in order to bring the housing into tolerance. On the other hand, if the dimension is sufficiently low so as to be out-of-tolerance, then it is desirable to further mill away a portion of the pad surface and designate the housing as one requiring a shim of an appropriate thickness to bring it up to tolerance.

It will be appreciated that this invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Gauge means for releasable attachment to internal combustion engines at the starter motor mounting point for determining proper positioning of starter motor housings relative to the engine flywheel on individual internal combustion engines, said gauge comprising:

(a) housing means with a base surface portion having a configuration defining a gauge mounting pad, means for attachment of said housing means to an internal combustion engine block at the mounting point for the engine starter motor housing;

(b) a pivot pin mounted within said housing means, an elongated lever arm having a bore formed therein for pivotal rotation about the axis of said pivot pin between the ends thereof to receive said pin to provide for pivotal movement of said lever arm within said housing means, and with first and second individual segments of said elongated lever arm extending in opposed directions from said pivot pin receiving bore;

(c) a mounting yoke operatively coupled to said housing means and having a shaft mounted therein for receiving a reference pinion for rotation thereon;

(d) said mounting yoke being operatively coupled to the first individual segment of said elongated lever arm adjacent the end of said first arm segment;

(e) reference scale means securably positioned onto said housing means adjacent the end of said second individual segment of said elongated lever arm, said reference scale means being adapted to indicate the position of said yoke when said housing means is attached to an individual internal combustion engine and said yoke-mounted reference pinion is in proper driving engagement with the flywheel of the engine upon which said gauge means is mounted.

2. The gauge means as defined in claim 1 being particularly characterized in that guide pin means are provided for controlling the movement of said yoke relative to said housing means.

3. The gauge means as defined in claim 1 being particularly characterized in that mechanical biasing means are provided to position said yoke and said reference pinion remote from the engine flywheel.

4. The gauge means as defined in claim 1 being particularly characterized in that locking means are provided for releasably holding said elongated lever arm in a predetermined position relative to said housing means.

* * * * *